US012191796B2

(12) United States Patent
Atchley et al.

(10) Patent No.: US 12,191,796 B2
(45) Date of Patent: Jan. 7, 2025

(54) ROOF INTEGRATED PHOTOVOLTAIC SYSTEM

(71) Applicant: GAF Energy LLC, Parsippany, NJ (US)

(72) Inventors: Brian Edward Atchley, Petaluma, CA (US); Peter Clemente, Warren, NJ (US); Nazar Dzoba, Edison, NJ (US); Anthony Folk, Whitehouse Station, NJ (US); Amy Ochsenrieter, Morristown, NJ (US); Daniel East, Petaluma, CA (US)

(73) Assignee: GAF Energy LLC, Parsippany, NJ (US)

( * ) Notice: Subject to any disclaimer, the term of this patent is extended or adjusted under 35 U.S.C. 154(b) by 188 days.

(21) Appl. No.: 17/870,645

(22) Filed: Jul. 21, 2022

(65) Prior Publication Data

US 2023/0018614 A1    Jan. 19, 2023

Related U.S. Application Data

(63) Continuation of application No. 17/123,831, filed on Dec. 16, 2020, now Pat. No. 11,398,795.
(Continued)

(51) Int. Cl.
*H02S 20/23* (2014.01)
*E04D 1/12* (2006.01)
(Continued)

(52) U.S. Cl.
CPC ............... *H02S 20/23* (2014.12); *E04D 1/12* (2013.01); *E04D 3/38* (2013.01); *E04D 5/144* (2013.01);
(Continued)

(58) Field of Classification Search
CPC ........... E04D 1/12; E04D 3/38; E04D 3/3605; E04D 5/144; E04D 5/148; F24S 25/613;
(Continued)

(56) References Cited

U.S. PATENT DOCUMENTS

| 1,981,467 A | 11/1934 | Radtke |
| 3,156,497 A | 11/1964 | Lessard |

(Continued)

FOREIGN PATENT DOCUMENTS

| CA | 2829440 C | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Jessie T Fonseca
(74) *Attorney, Agent, or Firm* — GREENBERG TRAURIG, LLP

(57) ABSTRACT

A roof integrated photovoltaic system includes a starter bar having a foot base and configured to be installed to a roof deck, a plurality of water shedding layers, and a photovoltaic module. One of the plurality of water shedding layers is configured to be installed over the foot base of the starter bar, and one of another of which is configured to overlap and be installed over the one of the plurality of water shedding layers. The system further includes a foot module configured to be attached to an upper portion of the photovoltaic module. A lower portion of the photovoltaic module is configured to align with the foot base of the starter bar, and the foot module is configured to be affixed on a last (Continued)

overlapping layer of the plurality of water shedding layers to the roof deck.

20 Claims, 11 Drawing Sheets

Related U.S. Application Data

(60) Provisional application No. 62/951,300, filed on Dec. 20, 2019.

(51) Int. Cl.
    *E04D 3/38* (2006.01)
    *E04D 5/14* (2006.01)
    *F24S 25/613* (2018.01)
    *H02S 30/00* (2014.01)
    *E04D 3/36* (2006.01)
    *F24S 20/00* (2018.01)
    *F24S 25/00* (2018.01)

(52) U.S. Cl.
    CPC ............ *E04D 5/148* (2013.01); *F24S 25/613* (2018.05); *H02S 30/00* (2013.01); *E04D 3/3605* (2013.01); *F24S 2020/12* (2018.05); *F24S 2025/021* (2018.05)

(58) Field of Classification Search
    CPC ............ F24S 2020/12; F24S 2025/021; H02S 20/23; H02S 30/00
    See application file for complete search history.

(56) References Cited

U.S. PATENT DOCUMENTS

| | | | |
|---|---|---|---|
| 3,581,779 A | 6/1971 | Gilbert, Jr. | |
| 4,258,948 A | 3/1981 | Hoffmann | |
| 4,349,220 A | 9/1982 | Carroll et al. | |
| 4,499,702 A | 2/1985 | Turner | |
| 4,636,577 A * | 1/1987 | Peterpaul | H02S 20/23 |
| | | | 136/251 |
| 5,167,579 A | 12/1992 | Rotter | |
| 5,437,735 A | 8/1995 | Younan et al. | |
| 5,590,495 A | 1/1997 | Bressler et al. | |
| 5,642,596 A | 7/1997 | Waddington | |
| 6,008,450 A | 12/1999 | Ohtsuka et al. | |
| 6,033,270 A | 3/2000 | Stuart | |
| 6,046,399 A | 4/2000 | Kapner | |
| 6,201,180 B1 | 3/2001 | Meyer et al. | |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,666,491 B2 | 2/2010 | Yang et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 * | 8/2013 | Geary | H02S 20/24 |
| | | | 52/173.3 |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rordigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |

(56) References Cited

U.S. PATENT DOCUMENTS

| | | |
|---|---|---|
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1* | 2/2008 | Placer ................... F24S 25/632 126/622 |
| 2008/0315061 A1 | 2/2008 | Placerl. et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1* | 10/2011 | Cook ...................... F24S 25/40 52/173.3 |
| 2011/0302859 A1* | 12/2011 | Crasnianski .......... F24S 25/634 52/173.3 |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1* | 6/2012 | Jenkins ................... F24S 25/61 52/173.3 |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0255250 A1* | 10/2012 | Wetmore .............. E04B 1/7046 52/302.6 |
| 2012/0260977 A1 | 10/2012 | Stancel |
| 2012/0266942 A1 | 10/2012 | Komatsu et al. |
| 2012/0279150 A1* | 11/2012 | Pisklak ................... H01L 31/05 52/173.3 |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |

(56) References Cited

U.S. PATENT DOCUMENTS

| | | |
|---|---|---|
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1* | 9/2018 | Yang ..................... H02S 20/23 |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A1 | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ROOF INTEGRATED PHOTOVOLTAIC SYSTEM

CROSS-REFERENCE TO RELATED APPLICATION

This application is a Section 111(a) application relating to and claiming the benefit of commonly-owned, U.S. Provisional Patent Application Ser. No. 62/951,300, filed Dec. 20, 2019, entitled "ROOF INTEGRATED PHOTOVOLTAIC SYSTEM," the contents of which is incorporated herein by reference in its entirety.

FIELD OF THE INVENTION

The present invention relates to roofing systems for structures and, more particularly, roofing systems having integrated photovoltaic systems.

BACKGROUND OF THE INVENTION

Photovoltaic systems having solar panel modules are commonly installed on roofing of structures. What is needed is a roof integrated photovoltaic system that provides for improved installation and serviceability while maintaining a top water shedding layer.

SUMMARY OF THE INVENTION

In an embodiment, a method, comprising installing at least one starter bar to a roof deck, wherein the at least one starter bar includes a foot base; installing one of a first plurality of water shedding layers over the foot base of the at least one starter bar; overlapping at least one of another of the first plurality of water shedding layers over the one of the first plurality of water shedding layers; and installing at least one first photovoltaic module, each of the at least one first photovoltaic module having a top surface, a bottom surface, an upper portion, a lower portion, a pair of side portions, each of which extends from the upper portion to the lower portion, and at least one first foot module attached to the upper portion, wherein the lower portion of each of the least one first photovoltaic module is aligned with the foot base of the at least one starter bar, and the at least one first foot module is affixed on a last overlapping layer of the at least one of another of the first plurality of water shedding layers to the roof deck.

In an embodiment, the last overlapping layer of the at least one of another of the first plurality of water shedding layers includes a second water shedding layer. In an embodiment, the at least one of another of the first plurality of water shedding layers includes a second water shedding layer overlapping the one of the first plurality of water shedding layers, and a third water shedding layer overlapping the second water shedding layer, the third water shedding layer being the last overlapping layer of the at least one of another of the first plurality of water shedding layers. In an embodiment, the at least one of another of the first plurality of water shedding layers includes a second water shedding layer overlapping the one of the first plurality of water shedding layers, a third water shedding layer overlapping the second water shedding layer, and a fourth water shedding layer overlapping the third water shedding layer, the fourth water shedding layer being the last overlapping layer of the at least one of another of the first plurality of water shedding layers. In an embodiment, the method further comprises the step of affixing the one of the first plurality of water shedding layers and the second water shedding layer to the roof deck. In an embodiment, the one of a first plurality of water shedding layers and the second water shedding layer are affixed to the roof deck by a plurality of nails. In an embodiment, the one of a first plurality of water shedding layers and the second water shedding layer are affixed to the roof deck by an adhesive.

In an embodiment, the method further comprises the step of affixing the one of the first plurality of water shedding layers and the second and third water shedding layers to the roof deck. In an embodiment, the one of the first plurality of water shedding layers and the second and third water shedding layers are affixed to the roof deck by a plurality of nails. In an embodiment, the method further comprises the step of affixing the one of the first plurality of water shedding layers and the second, third and fourth water shedding layers to the roof deck. In an embodiment, the one of the first plurality of water shedding layers and the second, third and fourth water shedding layers are affixed to the roof deck by a plurality of nails. In an embodiment, the one of the first plurality of water shedding layers and the second, third and fourth water shedding layers are affixed to the roof deck by an adhesive.

In an embodiment, the second water shedding layer includes a first edge that is positioned offset from the foot base of the starter bar. In an embodiment, the second water shedding layer includes a first edge that is positioned offset from the foot base of the starter bar, and the third water shedding layer includes a first edge that is positioned offset from the first edge of the second water shedding layer. In an embodiment, the second water shedding layer includes a first edge that is positioned offset from the foot base of the starter bar, the third water shedding layer includes a first edge that is positioned offset from the first edge of the second water shedding layer, and the fourth water shedding layer includes a first edge that is positioned offset from the first edge of the third water shedding layer. In an embodiment, the at least one first foot module includes a plurality of first foot modules. In an embodiment, the at least one starter bar includes a plurality of starter bars.

In an embodiment, the at least one first photovoltaic module includes a plurality of first photovoltaic modules, and wherein each of the lower portions of each of the plurality of first photovoltaic modules is aligned with a corresponding one of the foot base of the plurality of starter bars. In an embodiment, the plurality of first photovoltaic modules is installed in a formation of a first row. In an embodiment, the method further comprises the steps of installing one of a second plurality of water shedding layers over the at least one first module foot, and overlapping at least one of another of the second plurality of water shedding layers over the one of the second plurality of water shedding layers. In an embodiment, the method further comprises the step of installing at least one second photovoltaic module, the at least one second photovoltaic module having a top surface, a bottom surface, an upper portion, a lower portion, a pair of side portions, each of which extends from the upper portion of the at least one second photovoltaic module to the lower portion of the at least one second photovoltaic module, and at least one second foot module attached to the upper portion of the at least one second photovoltaic module, wherein the lower portion of the at least one second photovoltaic module is aligned with the at least one first foot module of the at least one first photovoltaic module, and the at least one second foot module is affixed on a last overlapping layer of the at least one of another of the second plurality of water shedding layers to the roof deck.

In an embodiment, the last overlapping layer of the at least one of another of the second plurality of water shedding layers includes a fifth water shedding layer. In an embodiment, the at least one of another of the second plurality of water shedding layers includes a fifth water shedding layer overlapping the one of the second plurality of water shedding layers, and a sixth water shedding layer overlapping the fifth water shedding layer, the sixth water shedding layer being the last overlapping layer of the at least one of another of the second plurality of water shedding layers. In an embodiment, the at least one of another of the second plurality of water shedding layers includes a fifth water shedding layer overlapping the one of the second plurality of water shedding layers, a sixth water shedding layer overlapping the fifth water shedding layer, and a seventh water shedding layer overlapping the sixth water shedding layer, the seventh water shedding layer being the last overlapping layer of the at least one of another of the second plurality of water shedding layers. In an embodiment, the method further comprises the step of affixing the one of the second plurality of water shedding layers and the fifth water shedding layer to the roof deck. In an embodiment, the one of the second plurality of water shedding layers and the fifth water shedding layer are affixed to the roof deck by a plurality of nails. In an embodiment, the one of the second plurality of water shedding layers and the fifth water shedding layer are affixed to the roof deck by an adhesive. In an embodiment, the method further comprises the step of affixing the one of the second plurality of water shedding layers and the fifth and sixth water shedding layers to the roof deck. In an embodiment, the one of the second plurality of water shedding layers and fifth and sixth water shedding layers are affixed to the roof deck by a plurality of nails. In an embodiment, the one of the second plurality of water shedding layers and fifth and sixth water shedding layers are affixed to the roof deck by an adhesive.

In an embodiment, the method further comprises the step of affixing the one of the second plurality of water shedding layers and the fifth, sixth and seventh water shedding layers to the roof deck. In an embodiment, the one of the second plurality of water shedding layers and the fifth, sixth and seventh water shedding layers are affixed to the roof deck by a plurality of nails. In an embodiment, the one of the second plurality of water shedding layers and the fifth, sixth and seventh water shedding layers are affixed to the roof deck by an adhesive. In an embodiment, the fifth water shedding layer includes a first edge that is positioned offset from the at least one first module foot of the at least one first photovoltaic module. In an embodiment, the fifth water shedding layer includes a first edge that is positioned offset from the at least one first module foot of the at least one first photovoltaic module, and the sixth water shedding layer includes a first edge that is positioned offset from the first edge of the fifth water shedding layer. In an embodiment, the fifth water shedding layer includes a first edge that is positioned offset from at least one first module foot of the at least one first photovoltaic module, the sixth water shedding layer includes a first edge that is positioned offset from the first edge of the fifth water shedding layer, and the seventh water shedding layer includes a first edge that is positioned offset from the first edge of the sixth water shedding layer.

In an embodiment, the at least one second foot module includes a plurality of second foot modules. In an embodiment, the at least one first photovoltaic module includes a plurality of first photovoltaic modules, and the at least one second photovoltaic module includes a plurality of second photovoltaic modules, wherein each of the lower portions of each of the plurality of second photovoltaic modules is aligned with a corresponding one of the at least one first module feet of each of the plurality of first photovoltaic modules. In an embodiment, the plurality of second photovoltaic modules is installed in a formation of a second row. In an embodiment, each of the plurality of second photovoltaic modules is aligned with a corresponding one of the plurality of first photovoltaic modules. In an embodiment, the method further comprises the step of installing at least one row of a plurality of shingles on the roof deck prior to the step of installing the at least one starter bar, wherein the at least one starter bar is affixed to at least one of the plurality of shingles. In an embodiment, each of the first and second pluralities of water shedding layers is flexible. In an embodiment, each of the first and second pluralities of water shedding layers is non-flexible.

In an embodiment, the step of overlapping the at least one of another of the first plurality of water shedding layers includes overlapping the at least one of another of the first plurality of water shedding layers over a first portion of the one of the first plurality of water shedding layers to create a second, revealed portion, and wherein the second, revealed portion of the one of the first plurality of water shedding layers includes a width that is approximately equal to a length of the at least one photovoltaic module. In an embodiment, the length of the at least one photovoltaic module extends from the upper portion of the at least one photovoltaic module to the lower portion of the at least one photovoltaic module. In an embodiment, the one of the first plurality of water shedding layers includes a width, and wherein the width of the second, revealed portion of the one of the first plurality of water shedding layers is approximately equal to half of the width of the one of the first plurality of water shedding layers.

In an embodiment, a method, comprising installing at least one starter bar to a roof deck, wherein the at least one starter bar includes a foot base; installing one of a plurality of water shedding layers over the foot base of the at least one starter bar; overlapping at least one of another of the plurality of water shedding layers over the one of the plurality of water shedding layers; affixing at least one first module foot on the at least one of another of the plurality of water shedding layers to the roof deck; and installing at least one first photovoltaic module, each of the at least one first photovoltaic module having a top surface, a bottom surface, an upper portion, a lower portion, a pair of side portions, each of which extends from the upper portion to the lower portion, wherein the lower portion of each of the least one first photovoltaic module is aligned with the foot base of the at least one starter bar, and the upper portion of the at least one first photovoltaic module is aligned with and attached to the at least one first module foot.

In an embodiment, a system, comprising a foot base having a first member and a second member extending angularly from the first member, wherein the foot base is configured to be installed on a roof deck such that the first member is positioned on the roof deck and the second member extends outwardly from the roof deck; and a flashing member having a first portion, and a second portion overlapping the first member of the foot base, wherein the first portion of the flashing member is configured to be affixed to the roof deck. In an embodiment, the first portion of the flashing member is affixed to the roof deck by a plurality of nails. In an embodiment, the first member of the foot base is affixed to the roof deck. In an embodiment, the first member of the foot base is affixed to the roof deck by at least one nail. In an embodiment, the first and second members of the foot base are integral. In an embodiment, the second member is substantially perpendicular to the first member. In an embodiment, the flashing member includes a third portion extending angularly from the second portion and attached to the second member of the foot base. In an embodiment, the third portion of the flashing member is attached to the second member of the foot base by at least one rivet. In an embodiment, the third portion of the flashing member is attached to the second member of the foot base by at least one screw. In an embodiment, the third portion of the flashing member is attached to the second member of the foot base by a spot weld. In an embodiment, the third portion of the flashing member is attached to the second member of the foot base by an adhesive.

In an embodiment, a system, comprising at least one starter bar configured to be installed to a roof deck, wherein the at least one starter bar includes a foot base; a first plurality of water shedding layers, one of which is configured to be installed over the foot base of the at least one starter bar, and at least one of another of which is configured to overlap and be installed over the one of the first plurality of water shedding layers; at least one first photovoltaic module having a top surface, a bottom surface, an upper portion, a lower portion, and a pair of side portions, each of which extends from the upper portion to the lower portion; and at least one first foot module configured to be attached to the upper portion of the at least one first photovoltaic module, wherein the lower portion of each of the least one first photovoltaic module is configured to align with the foot base of the at least one starter bar, and the at least one first foot module is configured to be affixed on a last overlapping layer of the at least one of another of the first plurality of water shedding layers to the roof deck.

In an embodiment, the last overlapping layer of the at least one of another of the first plurality of water shedding layers includes a second water shedding layer. In an embodiment, the at least one of another of the first plurality of water shedding layers includes a second water shedding layer configured to overlap the one of the first plurality of water shedding layers, and a third water shedding layer configured to overlap the second water shedding layer, the third water shedding layer being the last overlapping layer of the at least one of another of the first plurality of water shedding layers. In an embodiment, the at least one of another of the first plurality of water shedding layers includes a second water shedding layer configured to overlap the one of the first plurality of water shedding layers, a third water shedding layer configured to overlap the second water shedding layer, and a fourth water shedding layer configured to overlap the third water shedding layer, the fourth water shedding layer being the last overlapping layer of the at least one of another of the first plurality of water shedding layers. In an embodiment, the one of the first plurality of water shedding layers and the second water shedding layer are configured to be affixed to the roof deck. In an embodiment, the one of a first plurality of water shedding layers and the second water shedding layer are configured to be affixed to the roof deck by a plurality of nails. In an embodiment, the one of a first plurality of water shedding layers and the second water shedding layer are configured to be affixed to the roof deck by an adhesive. In an embodiment, the one of the first plurality of water shedding layers and the second and third water shedding layers are configured to be affixed to the roof deck. In an embodiment, the one of the first plurality of water shedding layers and the second and third water shedding layers are configured to be affixed to the roof deck by a plurality of nails. In an embodiment, the one of the first plurality of water shedding layers and the second and third water shedding layers are configured to be affixed to the roof deck by an adhesive. In an embodiment, the one of the first plurality of water shedding layers and the second, third and fourth water shedding layers are configured to be affixed to the roof deck. In an embodiment, the one of the first plurality of water shedding layers and the second, third and fourth water shedding layers are configured to be affixed to the roof deck by a plurality of nails. In an embodiment, the one of the first plurality of water shedding layers and the second, third and fourth water shedding layers are configured to be affixed to the roof deck by an adhesive.

In an embodiment, the at least one first foot module includes a plurality of first foot modules. In an embodiment, the at least one starter bar includes a plurality of starter bars. In an embodiment, the at least one first photovoltaic module includes a plurality of first photovoltaic modules, and wherein each of the lower portions of each of the plurality of first photovoltaic modules is configured to align with a corresponding one of the foot base of the plurality of starter bars.

In an embodiment, the system further comprises a second plurality of water shedding layers, one of which is configured to be installed over the at least one first module foot, and at least one of another of which is configured to overlap and be installed over the one of the second plurality of water shedding layers. In an embodiment, the system further comprises at least one second photovoltaic module, the at least one second photovoltaic module having a top surface, a bottom surface, an upper portion, a lower portion, and a pair of side portions, each of which extends from the upper portion of the at least one second photovoltaic module to the lower portion of the at least one second photovoltaic module; and at least one second foot module configured to be attached to the upper portion of the at least one second photovoltaic module, wherein the lower portion of the at least one second photovoltaic module is configured to align with the at least one first foot module of the at least one first photovoltaic module, and the at least one second foot module is configured to be affixed on a last overlapping layer of the at least one of another of the second plurality of water shedding layers to the roof deck.

In an embodiment, the last overlapping layer of the at least one of another of the second plurality of water shedding layers includes a fifth water shedding layer. In an embodiment, the at least one of another of the second plurality of water shedding layers includes a fifth water shedding layer configured to overlap the one of the second plurality of water shedding layers, and a sixth water shedding layer configured to overlap the fifth water shedding layer, the sixth water shedding layer being configured to be the last overlapping layer of the at least one of another of the second plurality of water shedding layers. In an embodiment, the at least one of another of the second plurality of water shedding layers includes a fifth water shedding layer configured to overlap the one of the second plurality of water shedding layers, a sixth water shedding layer configured to overlap the fifth water shedding layer, and a seventh water shedding layer configured to overlap the sixth water shedding layer, the seventh water shedding layer being configured to be the last overlapping layer of the at least one of another of the second plurality of water shedding layers. In an embodiment, the one of the second plurality of water shedding layers and the fifth water shedding layer are configured to be affixed to the roof deck. In an embodiment, the one of the second plurality of water shedding layers and the fifth water shedding layer are configured to be affixed to the roof deck by a plurality of nails. In an embodiment, the one of the second plurality of water shedding layers and the fifth water shedding layer are configured to be affixed to the roof deck by an adhesive. In an embodiment, the one of the second plurality of water shedding layers and the fifth and sixth water shedding layers are configured to be affixed to the roof deck. In an embodiment, the one of the second plurality of water shedding layers and fifth and sixth water shedding layers are configured to be affixed to the roof deck by a plurality of nails. In an embodiment, the one of the second plurality of water shedding layers and fifth and sixth water shedding layers are configured to be affixed to the roof deck by an adhesive. In an embodiment, the one of the second plurality of water shedding layers and the fifth, sixth and seventh water shedding layers are configured to be affixed to the roof deck. In an embodiment, the one of the second plurality of water shedding layers and the fifth, sixth and seventh water shedding layers are configured to be affixed to the roof deck by a plurality of nails. In an embodiment, the one of the second plurality of water shedding layers and the fifth, sixth and seventh water shedding layers are configured to be affixed to the roof deck by an adhesive.

In an embodiment, the at least one second foot module includes a plurality of second foot modules. In an embodiment, the at least one first photovoltaic module includes a plurality of first photovoltaic modules, and the at least one second photovoltaic module includes a plurality of second photovoltaic modules, wherein each of the lower portions of each of the plurality of second photovoltaic modules is configured to align with a corresponding one of the at least one first module feet of each of the plurality of first photovoltaic modules.

In an embodiment, the system further comprises a plurality of shingles configured to be installed on the roof deck. In an embodiment, the at least one starter bar is configured to be affixed to at least one of the plurality of shingles. In an embodiment, the system further comprises flashing configured to be installed on the roof deck and positioned intermediate the plurality of shingles and at least one of the first and second plurality of water shedding layers. In an embodiment, the flashing includes step flashing having a plurality of flashing members configured to be positioned substantially perpendicular to the roof deck, and wherein a side edge of each the first and second plurality of water shedding layers is juxtaposed with one side of each of the plurality of flashing members. In an embodiment, the side edge of each of the first and second plurality of water shedding layers is attached to the one side of each of the plurality of flashing members by an adhesive. In an embodiment, the flashing includes double-edge flashing having a first planar member and a second planar member extending substantially perpendicular to the first planar member, wherein the plurality of shingles is configured to be installed over the first planar member on one side of the second planar member, and the first and second plurality of water shedding layers are configured to be installed over the first planar member on an opposite side of the second planar member.

In an embodiment, the system further comprises a bracket for an MLPE, wherein the bracket is configured to be attached to the at least one first photovoltaic module and position the MLPE under the bottom surface of the at least one first photovoltaic module. In an embodiment, the bracket includes a pocket that is sized and shaped to removably receive the MLPE. In an embodiment, the pocket includes a C-shape. In an embodiment, the bracket includes at least one hook member configured to be removably attached to at least one of the top portion, the lower portion and either of the side portions of the at least one first photovoltaic module.

In an embodiment, each of the first and second pluralities of water shedding layers is flexible. In an embodiment, each of the first and second pluralities of water shedding layers is non-flexible.

DETAILED DESCRIPTION

Figure 1A:
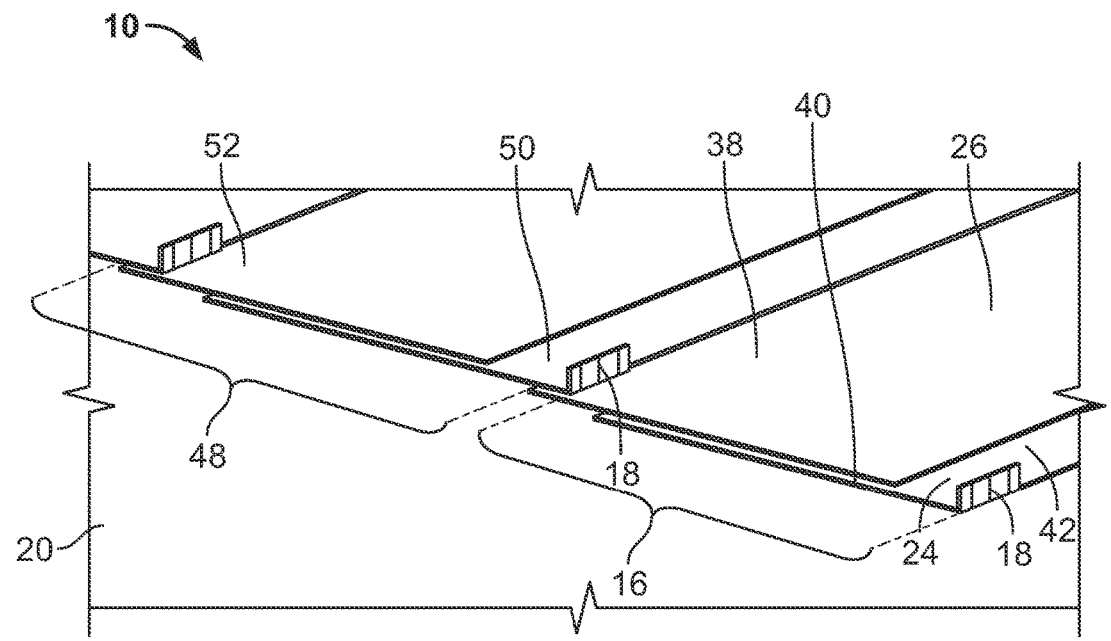
FIGS. 1A through 1D are top perspective views of embodiments of roofing water shedding layers employed by a roof integrated photovoltaic system, showing various widths of water shedding layers.
Figure 1B:
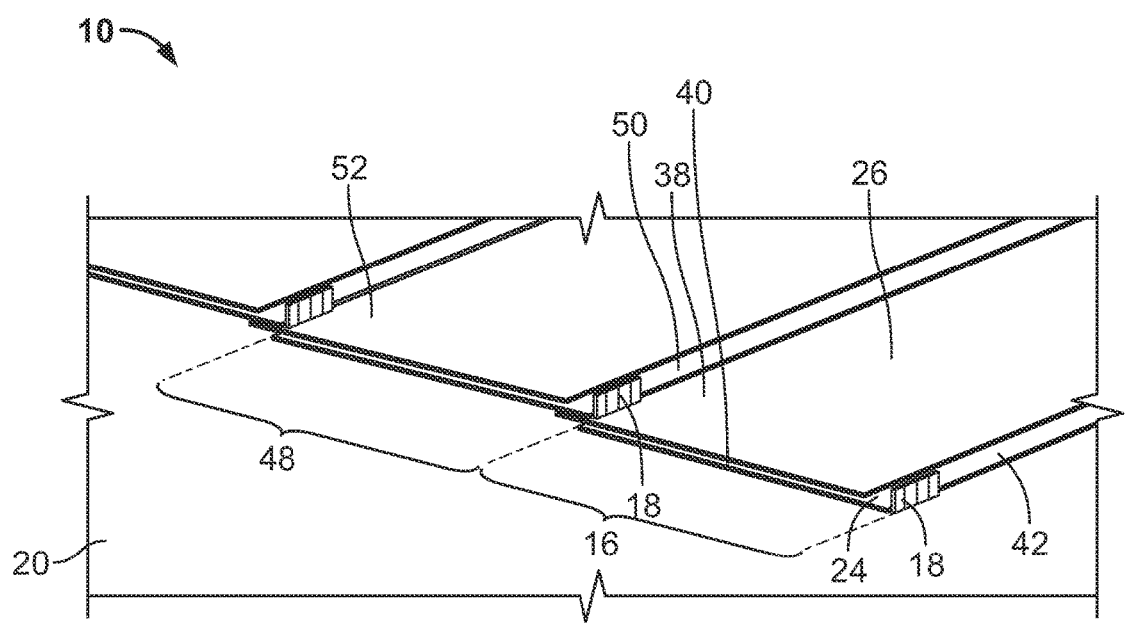
Figure 2:
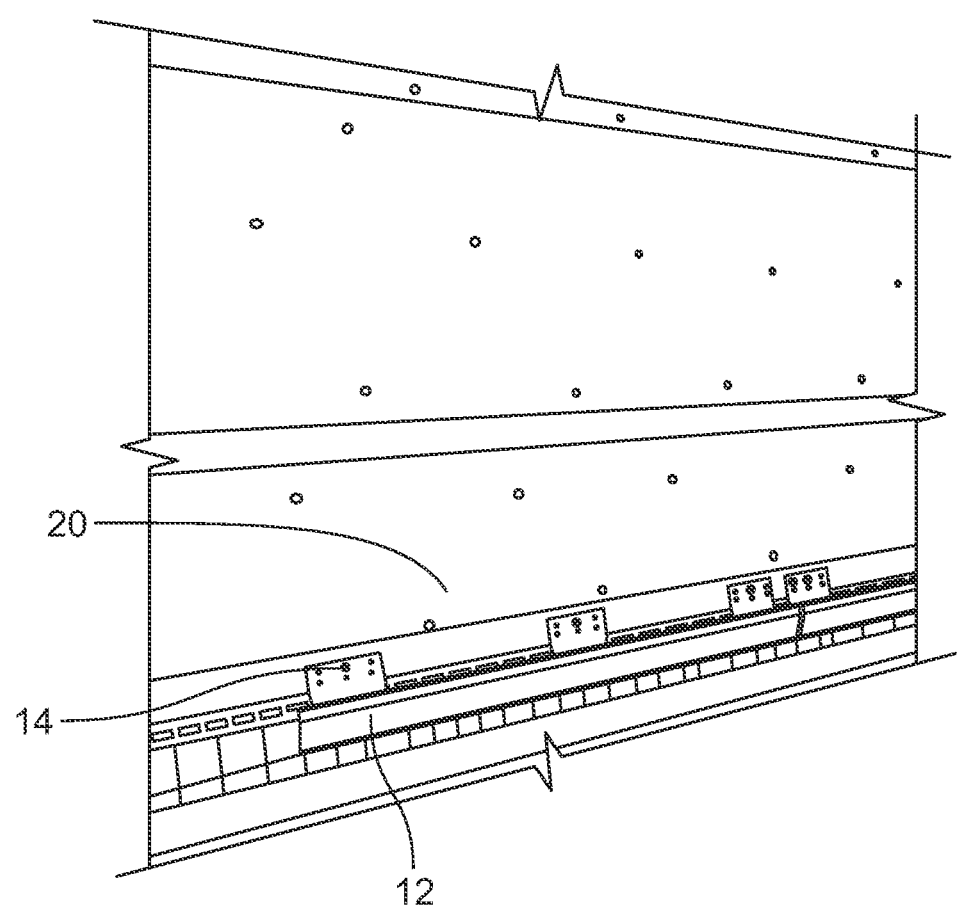
FIG. 2 is a photograph of an embodiment of a starter bar for a roof integrated photovoltaic system.

Referring to FIGS. 1A, 1B and 2, in an embodiment, a roof integrated photovoltaic system 10 includes at least one starter bar 12 having at least one foot base 14, a first plurality of water shedding layers 16, and at least one first foot module 18. In an embodiment, the at least one starter bar 12 is configured to be installed to a roof deck 20. In an embodiment, the at least one starter bar 12 is a metal extrusion, such as an aluminum extrusion. In an embodiment, the at least one foot base 14 is an L-shaped bracket. In an embodiment, the at least one foot base 14 includes a plurality of foot bases 14. In an embodiment, the at least one starter bar 12 includes a plurality of starter bars 12. In an embodiment, a plurality of shingles 22 is configured to be installed on the roof deck 20. In an embodiment, the at least one starter bar 12 is configured to be affixed to at least one of the plurality of shingles 22 (see FIG. 5). In an embodiment, each of the first plurality of water shedding layers 16 consists of MINERAL GUARD® roof rolling material manufactured and sold by GAF.

In an embodiment, one layer 24 of the first plurality of water shedding layers 16 is configured to be installed over the at least one foot base 14 of the at least one starter bar 12, and at least one of another layer 26 of the plurality of water shedding layers 16 is configured to overlap and be installed over the one layer 24 of the first plurality of water shedding layers 16. In an embodiment, each of the first plurality of water shedding layers 16 includes water shedding properties and acts a moisture barrier for the roof deck 20. In an embodiment, each of the first plurality of water shedding layers 16 includes fire retardant properties.

Figure 3:
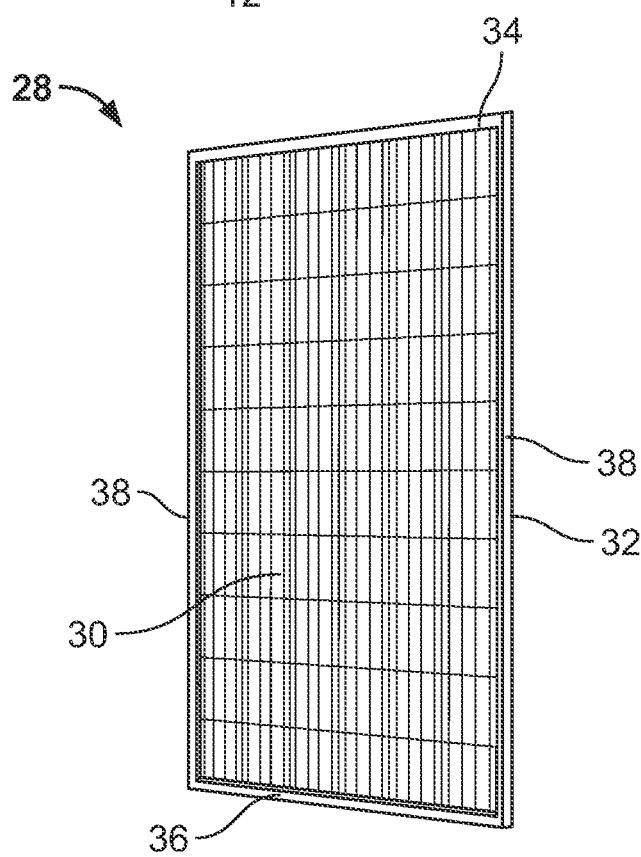
FIG. 3 is an embodiment of a photovoltaic module.

Referring to FIG. 3, in an embodiment, the system 10 includes at least one photovoltaic module 28 includes a top surface 30, a bottom surface 32, an upper portion 34, a lower portion 36, and a pair of side portions 38, each of which extends from the upper portion 34 to the lower portion 36. In an embodiment, the photovoltaic module 28 includes a locking frame as described and shown in U.S. Pat. No. 10,256,765 entitled "Roof Integrated Photovoltaic System," issued on Apr. 9, 2019, which is incorporated by reference herein. In an embodiment, the at least one first foot module 18 is configured to be attached to the upper portion 34 of the photovoltaic module 28, wherein the lower portion 36 of each of the least one first photovoltaic module is configured to align with the at least one foot base 14 of the at least one starter bar 12, and the at least one first foot module 18 is configured to be affixed on a last overlapping layer of the at least one layer 24 of another of the first plurality of water shedding layers 16 to the roof deck 20. In an embodiment, the last overlapping layer of the at least one of another layer 26 of the first plurality of water shedding layers 16 is a second water shedding layer 26. In an embodiment, the one layer 24 of the first plurality of water shedding layers 16 and the second water shedding layer 26 are configured to be affixed to the roof deck 20. In an embodiment, the one layer 24 of a first plurality of water shedding layers 16 and the second water shedding layer 26 are configured to be affixed to the roof deck 20 by a plurality of nails. In an embodiment, the one layer 24 of a first plurality of water shedding layers 16 and the second water shedding layer 26 are configured to be affixed to the roof deck 20 by an adhesive.

In an embodiment, the at least one of another layer 26 of the first plurality of water shedding layers 16 overlaps the at least one layer 24 of the first plurality of water shedding layers 16 over a first portion 40 of the one layer 24 of the first plurality of water shedding layers 16 to create a second, revealed portion 42. In an embodiment, the second, revealed portion 42 of the one layer 24 of the first plurality of water shedding layers 16 includes a width that is approximately equal to a length of the at least one photovoltaic module 28. In an embodiment, the length of the at least one photovoltaic module 28 extends from the upper portion 34 of the at least one photovoltaic module 28 to the lower portion 36 of the at least one photovoltaic module 28. In an embodiment, the one layer 24 of the first plurality of water shedding layers 16 includes a width, and wherein the width of the second, revealed portion 42 of the one layer 24 of the first plurality of water shedding layers 16 is approximately equal to half of the width of the one layer 24 of the first plurality of water shedding layers 16.

In another embodiment, the at least one of another layer 26 of the first plurality of water shedding layers 16 includes a second water shedding layer 26 configured to overlap the one layer 24 of the first plurality of water shedding layers 16, and a third water shedding layer 44 configured to overlap the second water shedding layer 26, the third water shedding layer 44 being the last overlapping layer of the at least one of another layer 26 of the first plurality of water shedding layers 16. In an embodiment, the one layer 24 of the first plurality of water shedding layers 16 and the second and third water shedding layers 26, 44 are configured to be affixed to the roof deck 20. In an embodiment, the one layer 24 of the first plurality of water shedding layers 16 and the second and third water shedding layers 26, 44 are configured to be affixed to the roof deck 20 by a plurality of nails. In an embodiment, the one layer 24 of the first plurality of water shedding layers 16 and the second and third water shedding layers 26, 44 are configured to be affixed to the roof deck 20 by an adhesive.

Figure 1C:
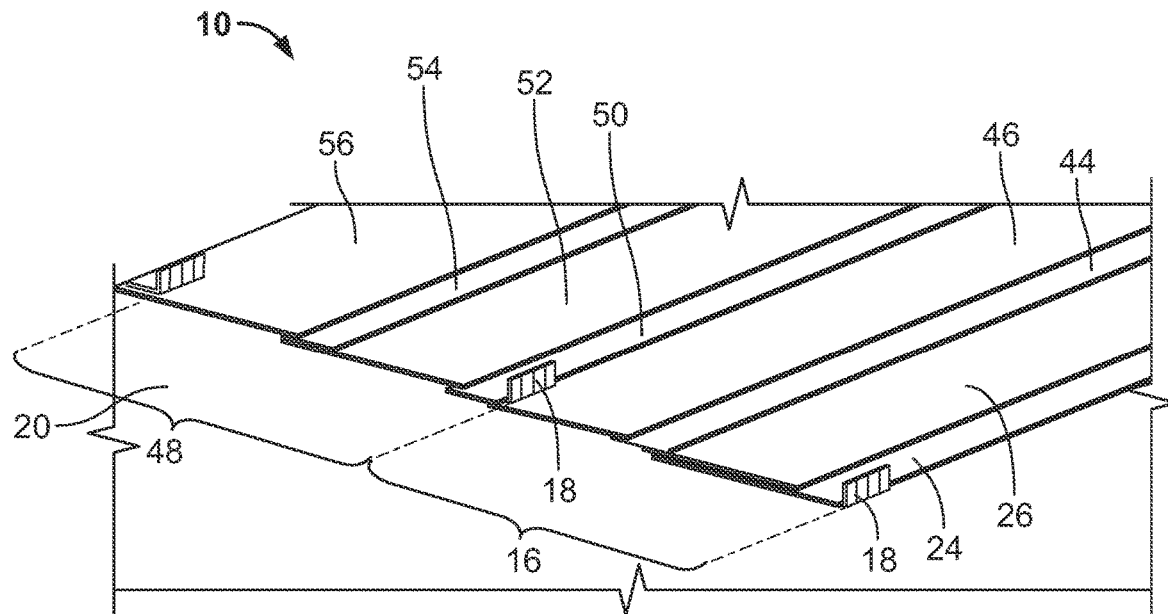
Figure 1D:
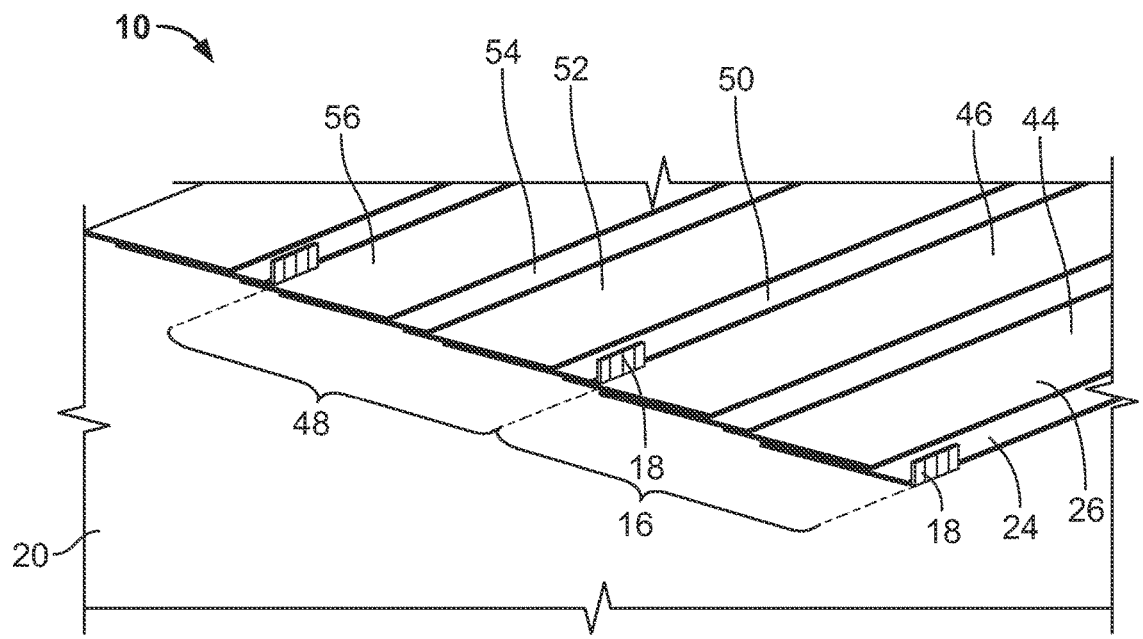

Referring to FIGS. 1C and 1D, in another embodiment, the at least one of another layer 26 of the first plurality of water shedding layers 16 includes a second water shedding layer 26 configured to overlap the one layer 24 of the first plurality of water shedding layers 16, a third water shedding layer 44 configured to overlap the second water shedding layer 26, and a fourth water shedding layer 46 configured to overlap the third water shedding layer 44, the fourth water shedding layer 46 being the last overlapping layer of the at least one of another layer 26 of the first plurality of water shedding layers 16. In an embodiment, the one layer 24 of the first plurality of water shedding layers 16 and the second, third and fourth water shedding layers 26, 44, 46 are configured to be affixed to the roof deck 20. In an embodiment, the one layer 24 of the first plurality of water shedding layers 16 and the second, third and fourth water shedding layers 26, 44, 46 are configured to be affixed to the roof deck 20 by a plurality of nails. In an embodiment, the one layer 24 of the first plurality of water shedding layers 16 and the second, third and fourth water shedding layers 26, 44, 46 are configured to be affixed to the roof deck 20 by an adhesive.

In an embodiment, the at least one first foot module 18 includes a plurality of first foot modules 18. In an embodiment, the at least one starter bar 12 includes a plurality of starter bars 12. In an embodiment, the at least one first photovoltaic module 28 includes a plurality of first photovoltaic modules 28, and each of the lower portions 36 of each of the plurality of first photovoltaic modules 28 is configured to align with a corresponding one of the at least one foot base 14 of the plurality of starter bars 12.

Referring back to FIGS. 1A and 1B, in an embodiment, the system 10 includes a second plurality of water shedding layers 48, one layer 50 of which is configured to be installed over the at least one first foot module 18, and at least one of another layer 52 of which is configured to overlap and be installed over the one layer 50 of the second plurality of water shedding layers 48. In an embodiment, the system 10 includes at least one second photovoltaic module 28, the lower portion 36 of the at least one second photovoltaic module 28 is configured to align with the at least one first foot module 18 of the at least one first photovoltaic module 28, and at least one second foot module 18 is configured to be affixed on a last overlapping layer of the at least one of another of the second plurality of water shedding layers 48 to the roof deck 20. In an embodiment, each of the second plurality of water shedding layers 48 consists of MINERAL GUARD® roof rolling material manufactured and sold by GAF.

In an embodiment, the last overlapping layer of the at least one of another layer 52 of the second plurality of water shedding layers 48 is a fifth water shedding layer 52. In an embodiment, the one layer 50 of the second plurality of water shedding layers 48 and the fifth water shedding layer 52 are configured to be affixed to the roof deck 20. In an embodiment, the one layer 50 of the second plurality of water shedding layers 48 and the fifth water shedding layer 52 are configured to be affixed to the roof deck 20 by a plurality of nails. In an embodiment, the one 50 of the second plurality of water shedding layers 48 and the fifth water shedding layer 52 are configured to be affixed to the roof deck 20 by an adhesive.

In an embodiment, the at least one of another layer 52 of the second plurality of water shedding layers 48 includes a fifth water shedding layer 52 configured to overlap the one 50 of the second plurality of water shedding layers 48, and a sixth water shedding layer 54 configured to overlap the fifth water shedding layer 52, the sixth water shedding layer 54 being configured to be the last overlapping layer of the at least one of another layer 52 of the second plurality of water shedding layers 48. In an embodiment, the one 50 of the second plurality of water shedding layers 48 and the fifth and sixth water shedding layers 52, 54 are configured to be affixed to the roof deck 20. In an embodiment, the one 50 of the second plurality of water shedding layers 48 and fifth and sixth water shedding layers 52, 54 are configured to be affixed to the roof deck 20 by a plurality of nails. In an embodiment, the one 50 of the second plurality of water shedding layers 48 and fifth and sixth water shedding layers 52, 54 are configured to be affixed to the roof deck 20 by an adhesive.

Referring back to FIGS. 1C and 1D, in an embodiment, the at least one of another 50 of the second plurality of water shedding layers 48 includes a fifth water shedding layer 52 configured to overlap the one 50 of the second plurality of water shedding layers 48, a sixth water shedding layer 54 configured to overlap the fifth water shedding layer 52, and a seventh water shedding layer 56 configured to overlap the sixth water shedding layer 54, the seventh water shedding layer 56 being configured to be the last overlapping layer of the at least one of another layer 52 of the second plurality of water shedding layers 48.

In an embodiment, the second plurality of water shedding layers 48 and the fifth, sixth and seventh water shedding layers 52, 54, 56 are configured to be affixed to the roof deck 20. In an embodiment, the one 50 of the second plurality of water shedding layers 48 and the fifth, sixth and seventh water shedding layers 52, 54, 56 are configured to be affixed to the roof deck 20 by a plurality of nails. In an embodiment, the one 50 of the second plurality of water shedding layers 48 and the fifth, sixth and seventh water shedding layers 52, 54, 56 are configured to be affixed to the roof deck 20 by an adhesive.

Figure 4:
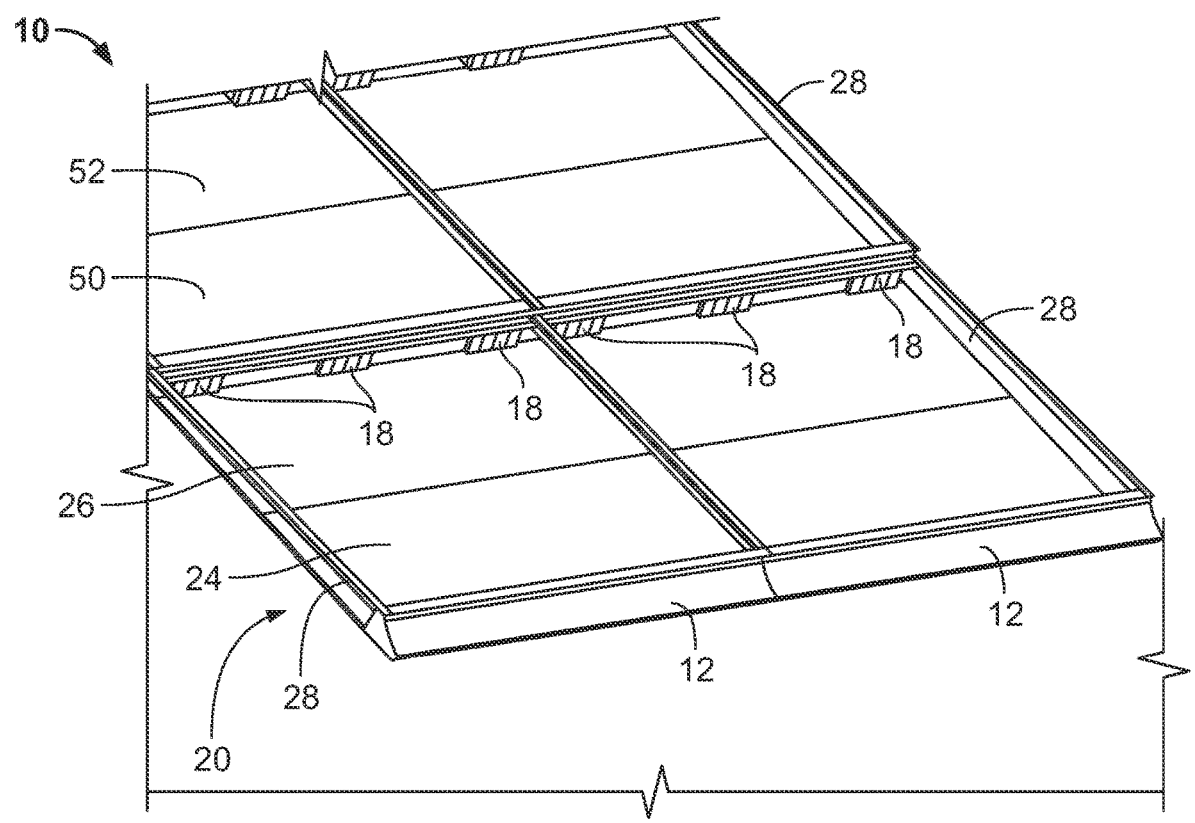
FIG. 4 is a top perspective view of an embodiment of a roof integrated photovoltaic system.
Figure 5:
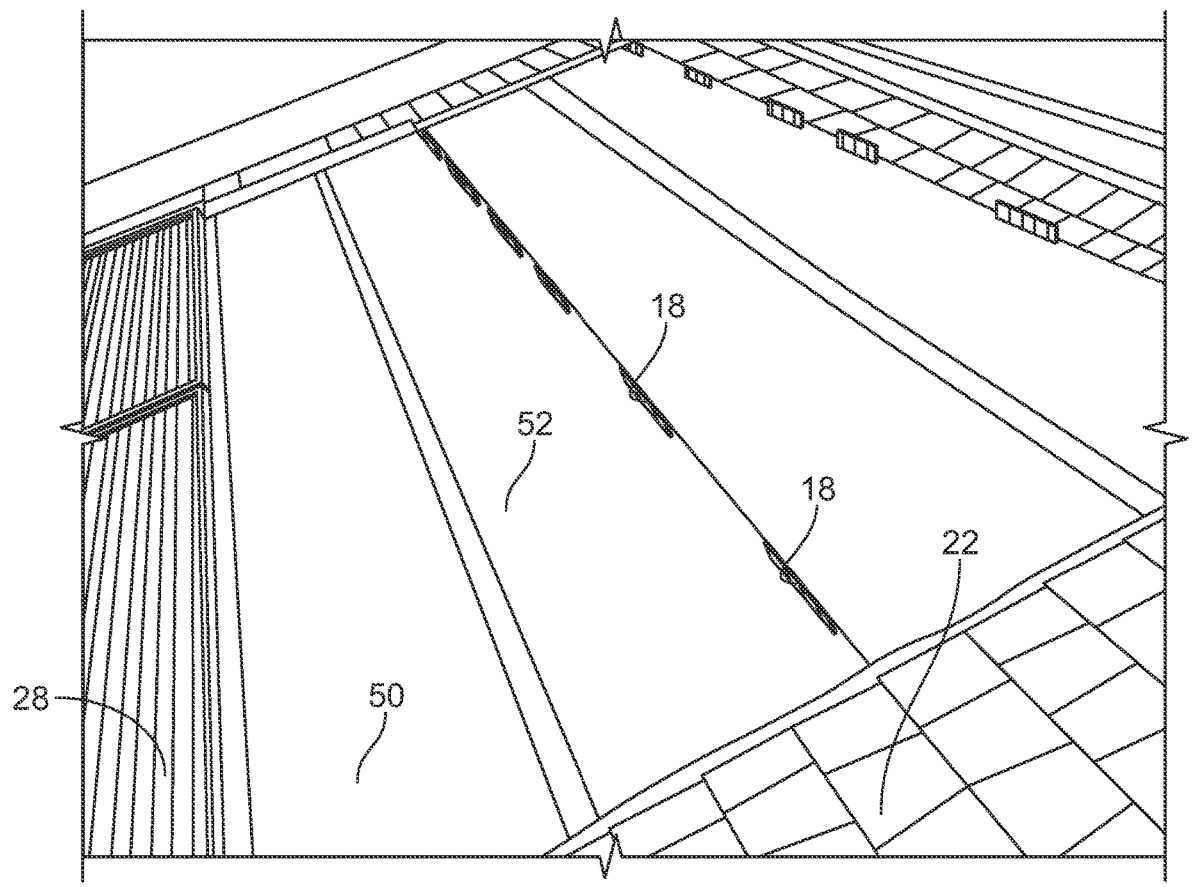
FIG. 5 is a photograph of an embodiment of an installed roof integrated photovoltaic system including one row of installed photovoltaic modules.

In an embodiment, the at least one second foot module 18 includes a plurality of second foot modules 18. In an embodiment, the at least one first photovoltaic module 28 includes a plurality of first photovoltaic modules 28, and the at least one second photovoltaic module 28 includes a plurality of second photovoltaic modules 28, wherein each of the lower portions 36 of each of the plurality of second photovoltaic modules 28 is configured to align with a corresponding one of the at least one first foot module 18 of each of the plurality of first photovoltaic modules 28. FIGS. 4 and 5 show the system installed.

Figure 6:
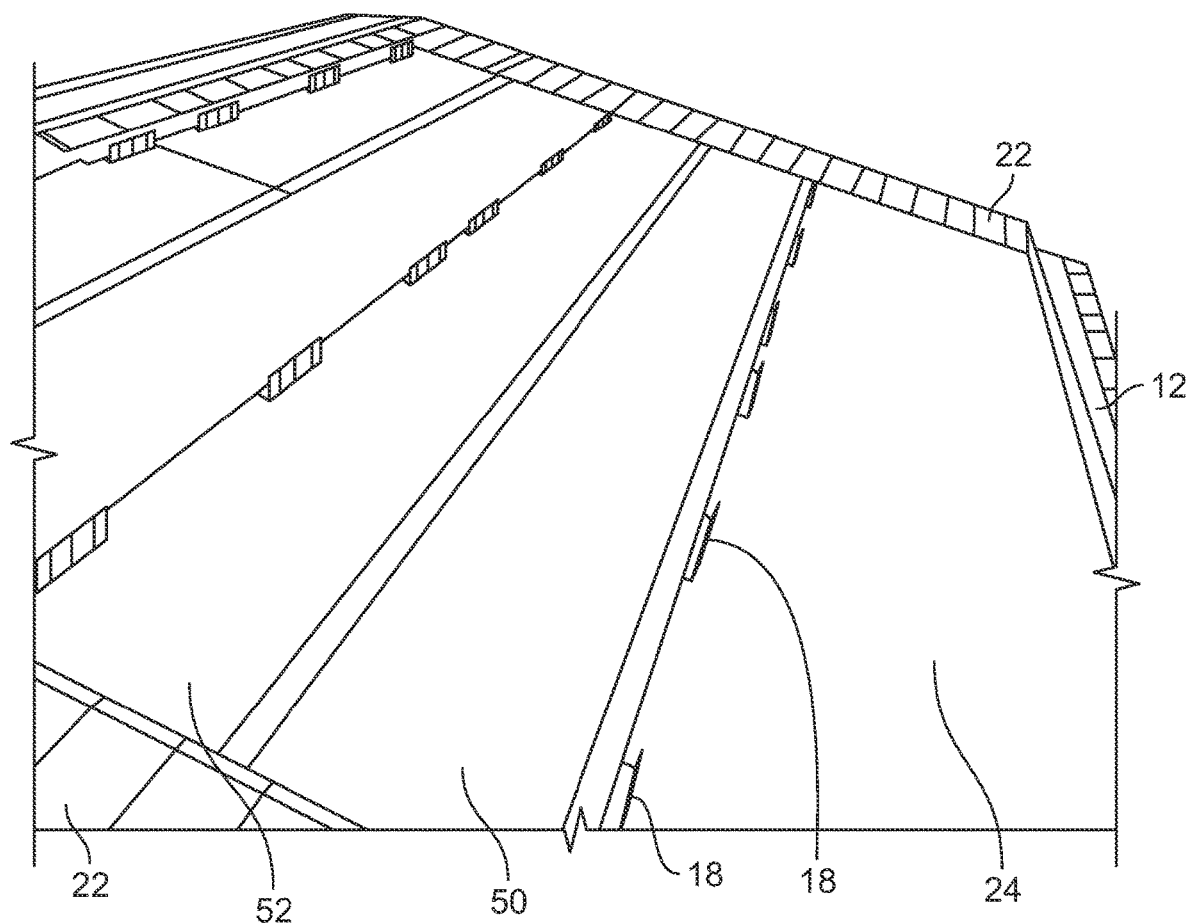
FIG. 6 is a photograph of an embodiment of an installed roof integrated photovoltaic system with the photovoltaic modules removed.

Referring to FIG. 6, in an embodiment, when one or more of the photovoltaic modules 28 require servicing, repair or replacement, the photovoltaic modules 28 are removed from the at least one first foot module 18 and/or the at least one starter bar 12, as applicable, leaving the at least one first foot module 18 and the at least one starter bar 12 attached to the roof deck 20.

Referring to FIGS. 7A through 7D, in an embodiment, a roofing foot base system 100 includes a foot base 102 having a first member 104 and a second member 106 extending angularly from the first member 104. In an embodiment, the foot base 102 is configured to be installed on the roof deck 20 such that the first member 104 is positioned on the roof deck 20 and the second member 106 extends outwardly from the roof deck 20. In an embodiment, the roofing foot base system 100 includes a flashing member 108 having a first portion 110, and a second portion 112 overlapping the first member 104 of the foot base 102. In an embodiment, the first portion 110 of the flashing member 108 is configured to be affixed to the roof deck 20. In an embodiment, the first portion 110 of the flashing member 108 is affixed to the roof deck 20 by a plurality of nails 114. In an embodiment, the first member 104 of the foot base 102 is affixed to the roof deck 20. In an embodiment, the first member 104 of the foot base 102 is affixed to the roof deck 20 by at least one nail. In an embodiment, the first and second members 104, 106 of the foot base 102 are integral. In an embodiment, the second member 106 is substantially perpendicular to the first member 104.

Figure 7A:
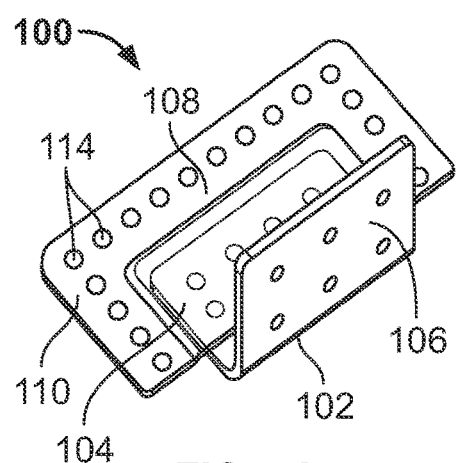
FIGS. 7A through 7D are top perspective, top plan, and two side elevational views, respectively, of embodiments of a system including a foot base and a flashing member for a roof.
Figure 7B:
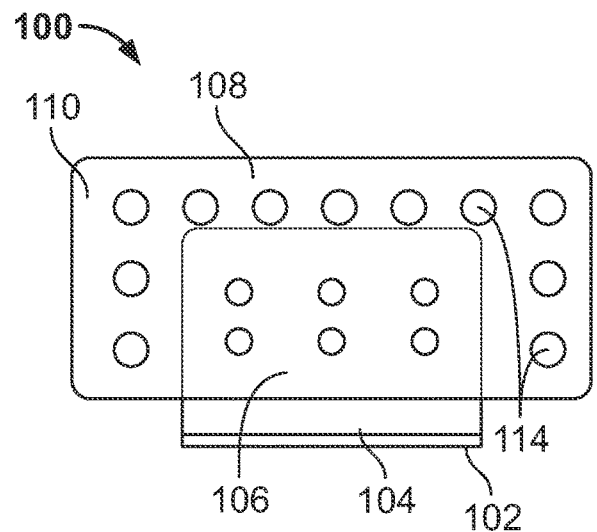
Figure 7C:
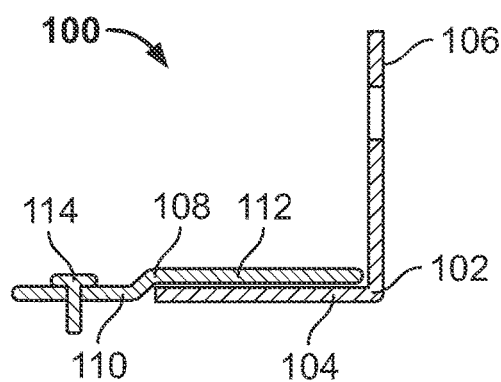
Figure 7D:
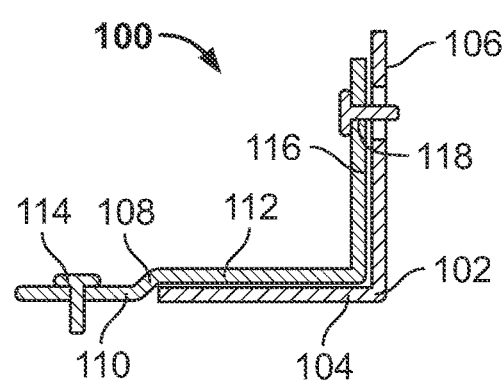

Referring to FIG. 7D, in another embodiment, the flashing member 108 includes a third portion 116 extending angularly from the second portion 112 and attached to the second member 106 of the foot base 102. In an embodiment, the third portion 116 of the flashing member 108 is attached to the second member 106 of the foot base 102 by at least one rivet 118. In an embodiment, the third portion 116 of the flashing member 108 is attached to the second member 106 of the foot base 102 by at least one screw. In an embodiment, the third portion 116 of the flashing member 108 is attached to the second member 106 of the foot base 102 by a spot weld. In an embodiment, the third portion 116 of the flashing member 108 is attached to the second member 106 of the foot base 102 by an adhesive.

In an embodiment, the flashing member 108 is made from metal. In an embodiment, the flashing member 108 is made from aluminum. In another embodiment, the flashing member 108 is made from stainless steel. In another embodiment, the flashing member 108 is made from galvalume. In another embodiment, the flashing member 108 is made from a polymer. In an embodiment, the flashing member 108 is made from a composite material. In another embodiment, the flashing member 108 is made from fiberglass.

Figure 8:
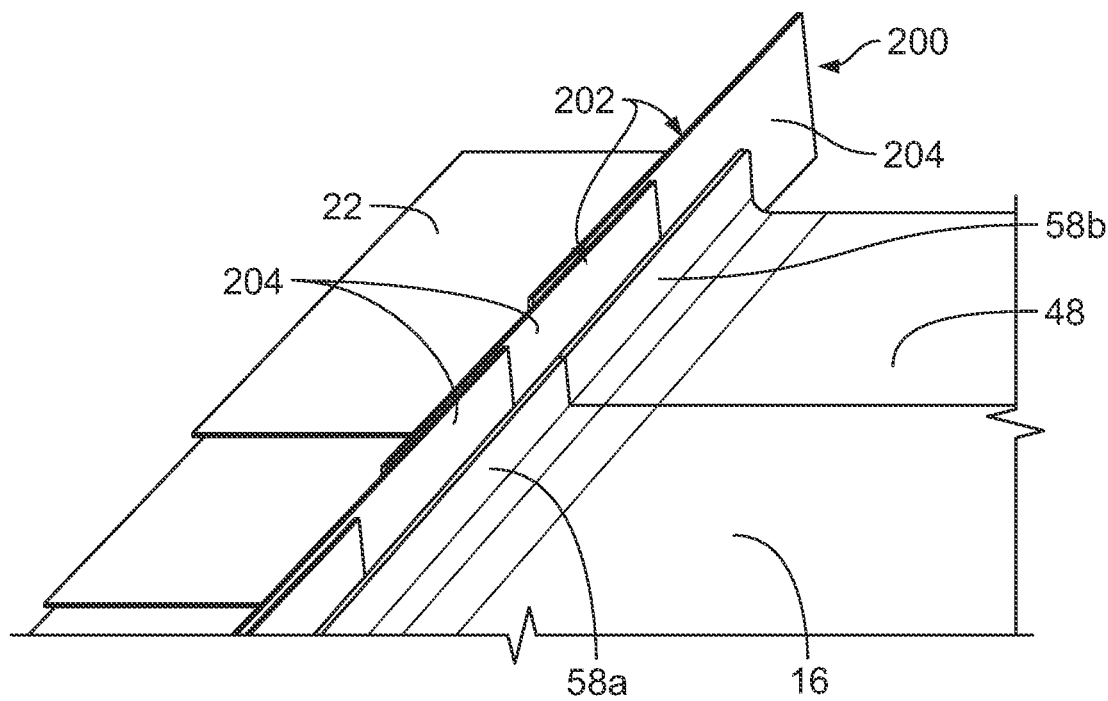
FIG. 8 is a top perspective view of a transition between roof water shedding layers and roofing shingles with step flashing.
Figure 9:
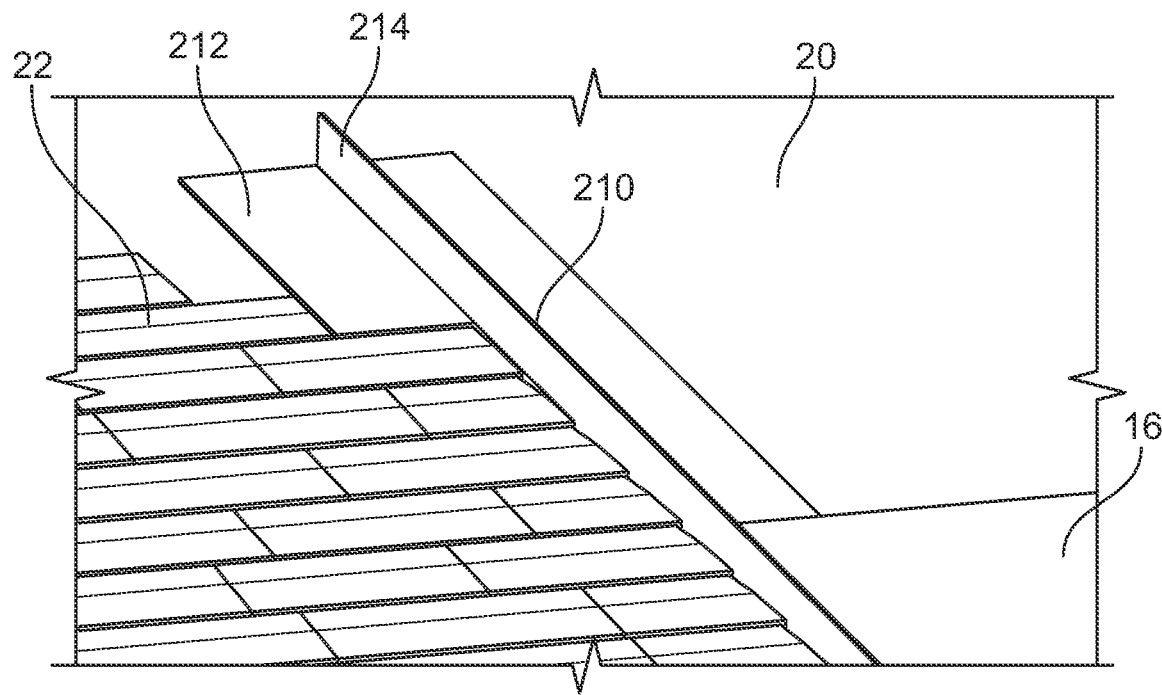
FIG. 9 is a top perspective view of a transition between roof water shedding layers and roofing shingles with T-type/double-edge flashing.

Referring to FIGS. 8 and 9, in an embodiment, the system 10 further comprises flashing configured to be installed on the roof deck 20 and positioned intermediate the plurality of shingles 22 and at least one of the first and second plurality of water shedding layers 16, 48. Referring to FIG. 8, in an embodiment, the flashing includes step flashing 200 having a plurality of flashing members 202 configured to be positioned substantially perpendicular to the roof deck 20, and wherein side edges 58a, 58b of each the first and second plurality of water shedding layers 16, 48, respectively, are juxtaposed with one side 204 of each of the plurality of flashing members 202. In an embodiment, the side edges 58a, 58b of each of the first and second plurality of water shedding layers 16, 48 is attached to the one side 204 of each of the plurality of flashing members 202 by an adhesive.

Referring to FIG. 9, in an embodiment, the flashing includes double-edge flashing 210 having a first planar member 212 and a second planar member 214 extending substantially perpendicular to the first planar member 212. In an embodiment, the plurality of shingles 22 is configured to be installed over the first planar member 212 on one side of the second planar member 214, and the first and second plurality of water shedding layers 16, 48 are configured to be installed over the first planar member 212 on an opposite side of the second planar member 214.

In an embodiment, the system 10 creates a solar plane that is different than the shingle plane comprised of the roofing system surrounding the photovoltaic modules 28. The transition between shingle plane and the solar plane is compatible with the system 10 and the application of flashing between the planes assures water shedding at the surface covered with the shingles 22. In an alternate embodiment, sealant materials are used for sealing the boundary area between the solar plane and the shingle plane.

Figure 10:
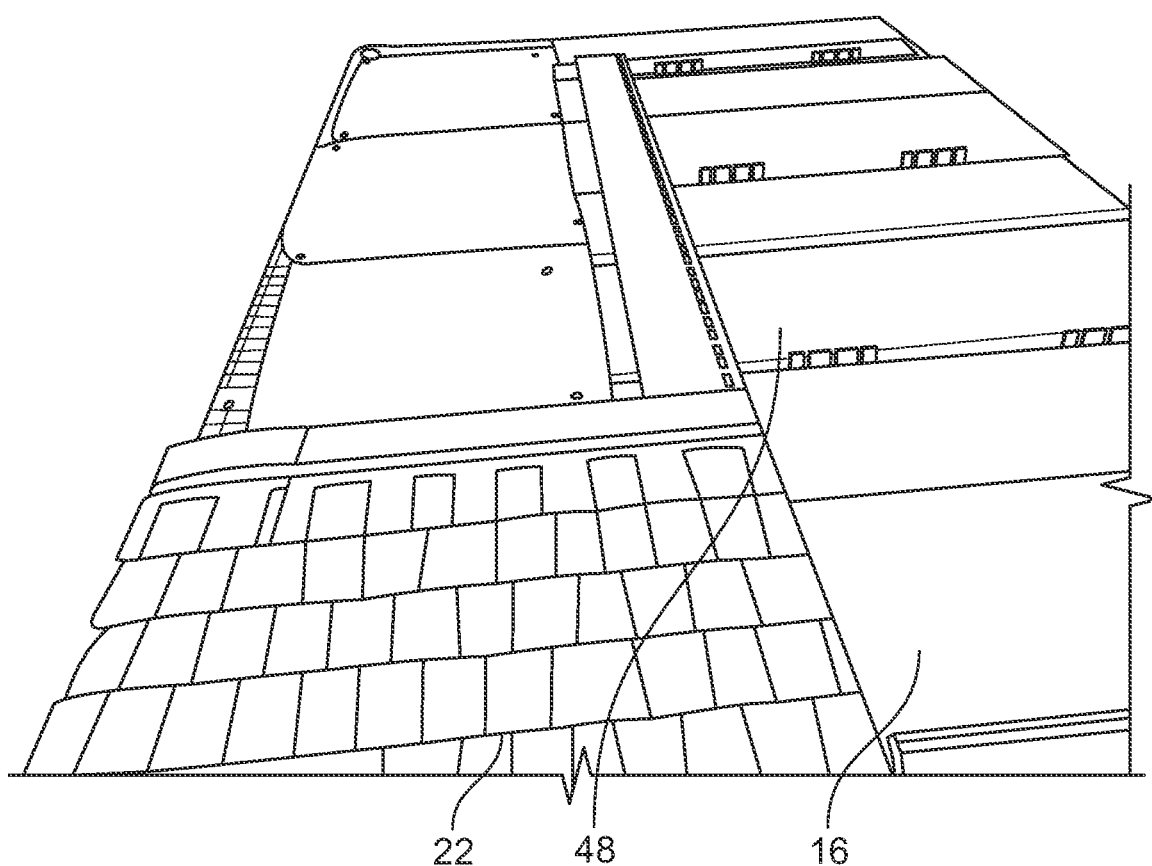
FIG. 10 is a photograph of an embodiment of a roof integrated photovoltaic system showing a transition between a solar roofing plane and a roof shingle plane without flashing.

Referring to FIG. 10, in an embodiment, to avoid any flashing between the solar plane and the shingle plane, the water shedding layers 16, 48 are extended within a certain width under the roofing plane. In an embodiment, the overlapping area is mechanically bounded by a vertical layer that includes adhesive on both sides. In an embodiment, the water shedding layers 16, 48 are extended under the shingle area, which the shingles 22 will be installed. The water shedding layers 16, 48 are installed vertically on top of another water shedding layer. In an embodiment, the shingles 22 are installed to cover the top water shedding layer of the overlapping region. In an embodiment, top corners of the shingles 22 are clipped to keep water flow towards the array and avoid water running across the top of the shingles 22.

Figure 11A:
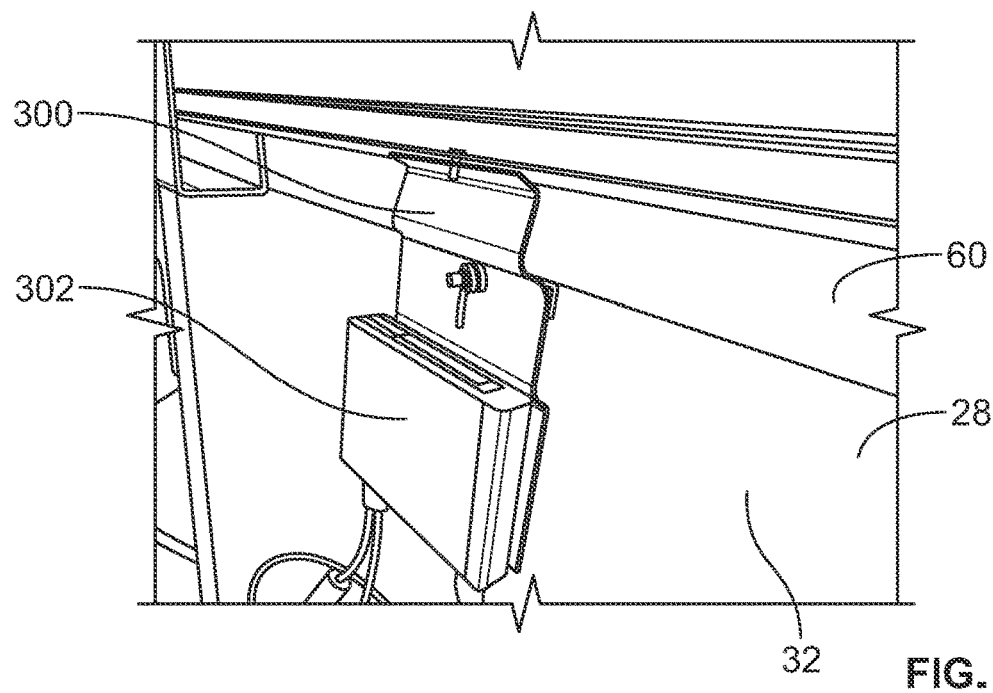
FIGS. 11A through 11C show embodiments of brackets for module-level power electronics for a photovoltaic system.
Figure 11B:
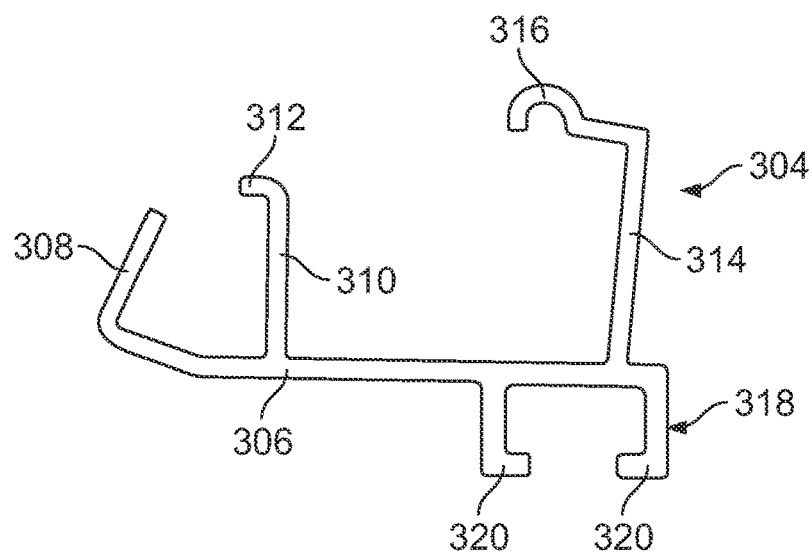

Referring to FIG. 11A, in an embodiment, the system 10 includes a bracket 300 for a module level power electronic (MLPE) apparatus 302. In an embodiment, the bracket 300 is configured to be attached to the any of the photovoltaic modules 28 and position the MLPE apparatus 302 under the bottom surface 32 thereof such that the photovoltaic modules 28 cover the MLPE apparatus 302 to which it is attached. In some embodiments, the MLPE apparatus 302 includes optimizers, such as DC/DC converters, micro-inverters, such as DC/AC converters, rapid shutdown devices, and power monitoring devices. Referring to FIG. 11B, in an embodiment, a bracket 304 includes a linear base member 306, a first, L-shaped member 308 extending from one side thereof and at one end of the base member 306, a second, J-shaped member 310 extending from the one side of the base member 306 proximate to the first member 308 and having a hook portion 312, and a third member 314 extending from one side of the base member 306 at an opposite end thereof. In an embodiment, the third member 314 includes a hook portion 316. In an embodiment, the first, second and third members 308, 310, 314 are each connected to a frame 60 of one of the upper portion 34, lower portion 36 or side portions 38 of the photovoltaic modules 28. In an embodiment, the hook portions 312, 316 of the second and third members 310, 314, respectively, are configured to be secured to the frame 60. In an embodiment, the bracket 304 includes a pocket extending from an opposite side of the base member 306 and include a pair of opposed L-shaped members 320. In an embodiment, the pocket 318 is sized and shaped to removably receive the MLPE apparatus 302. In an embodiment, the pocket 318 includes a C-shape cross-section. In other embodiment, the pocket 318 includes other suitable shapes and sizes to secure the MLPE apparatus 302.

Figure 11C:
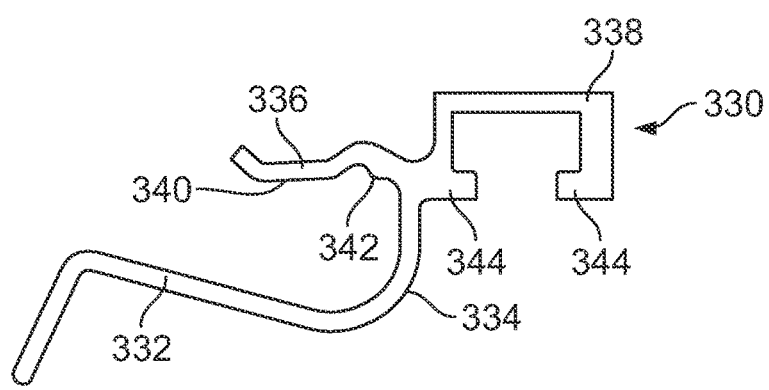

Referring to FIG. 11C, in another embodiment, a bracket 330 includes a first member 332 having a curved portion 334, a second member 336 extending from one side of the curved portion 334, and a pocket 338 extending from an opposite side of the second member 336. In an embodiment, the second member 336 includes a channel 340 formed within an inner side 342 thereof and configured to be secured to the frame 60 of the photovoltaic module 28. In an embodiment, the pocket 338 is sized and shaped to removably receive the MLPE apparatus 302. In an embodiment, the pocket 338 includes a pair of opposed L-shaped members 344. In an embodiment, the pocket 338 includes a C-shape cross-section. In other embodiment, the pocket 338 includes other suitable shapes and sizes to secure the MLPE apparatus 302.

Figure 12:
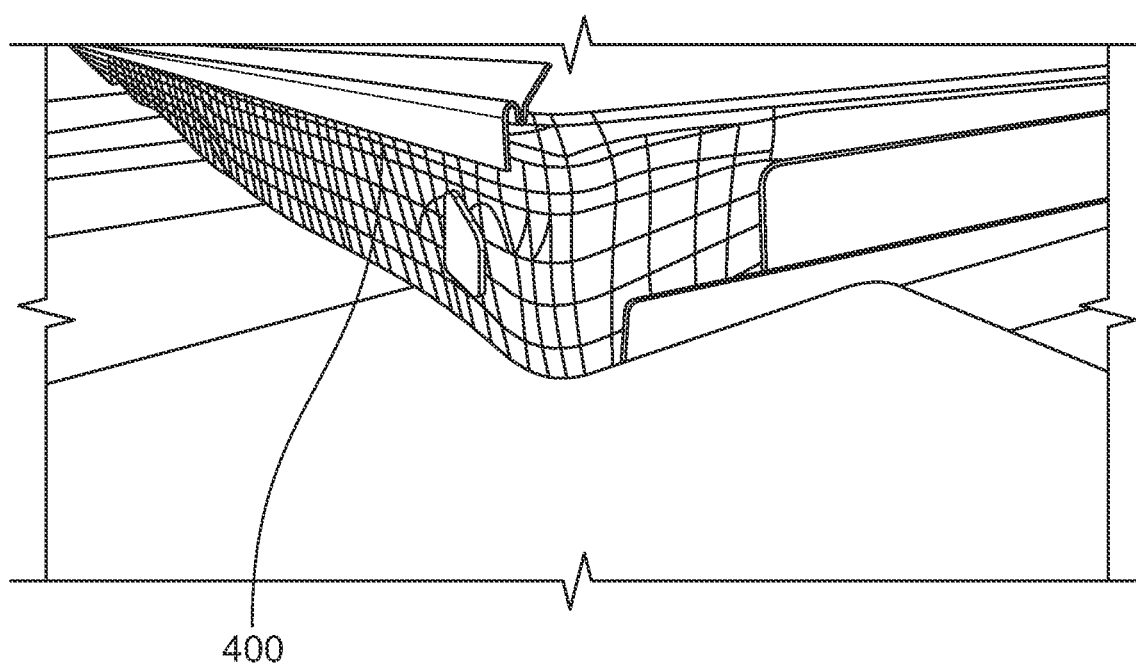
FIG. 12 is a photograph of an embodiment of a net employed by a roof integrated photovoltaic system.

Referring to FIG. 12, the system 10 includes a net 400 positioned around the perimeter of the photovoltaic module 28 to prevent pests from entering a space between the photovoltaic module 28 and the water shedding layers 16, 48 thereunder.

In another embodiment, a method for installing a roof integrated photovoltaic system includes the following steps:

Installing a base layer to a roof deck, the base layer having a first side and a second side opposite the first side, the first side including an adhesive with a first width and the second side including an adhesive with a second width that is narrower than the first width. In an embodiment, the base layer consists of QUICK-START® peel and stick starter roll roofing material manufactured and sold by GAF.

Installing a starter bar on the base layer and to the roof deck, the starter bar including a foot base. In an embodiment, the foot base is affixed to the roof deck by fasteners.

Installing a first water shedding layer over the foot base of the starter bar and affixing the first water shedding layer to the roof deck. In an embodiment, the width of the first water shedding layer will be about half of the width of the subsequently installed water shedding layers. In an embodiment, the first water shedding layer is affixed to the roof deck by a plurality of fasteners. In an embodiment, the first water shedding layer covers the fasteners affixing the starter bar to protect them from moisture penetration.

Installing a second water shedding layer over the first water shedding layer. In an embodiment, the second water shedding layer includes a width that is twice the width of the first water shedding layer. In an embodiment, the second water shedding layer fully covers the first water shedding layer. In an embodiment, the second water shedding layers is affixed to the roof deck by a plurality of fasteners. In an embodiment, from this point forward, each full-width of the water shedding layers is shifted by half of the width.

Installing foot modules on the second water shedding layer.

Installing a third water shedding layer over the foot modules. This method ensures every point on the roof deck is covered by two layers of the water shedding layers. In an embodiment, each fastener is sandwiched between a water shedding layer underneath the fastener and a water shedding layer below the fastener. In another alternate embodiment, if only one water shedding layer is required, the overlap between the water shedding layers will be characterized to the fastener zones to cover the fasteners. In this regard, the shift between the water shedding layers will be more than half of the width of the water shedding layers. In an embodiment, the water shedding layers include a width equal to width of the photovoltaic module width divided evenly, thereby foregoing the need for pre-measuring and enabling self-templating.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated). All such variations and modifications are intended to be included within the scope of the invention as defined in the appended claims.

What is claimed is:

1. A roofing system, comprising:
a roof deck comprising a first area and a second area, wherein the second area of the roof deck is located adjacent the first area of the roof deck;
at least one water shedding layer installed on the first area of the roof deck, wherein the at least one water shedding layer comprises at least a first water shedding layer, wherein the first water shedding layer comprises a reveal portion; and
a plurality of roofing shingles installed on the second area of the roof deck, wherein the plurality of roofing shingles comprises at least a first roofing shingle and a second roofing shingle,
wherein ends of the first roofing shingle and the second roofing shingle are adjacent to an end of the at least one water shedding layer, wherein the ends of the first roofing shingle and the second roofing shingle do not overlap the at least one water shedding layer,
wherein the first roofing shingle comprises an overlap portion and a reveal portion,
wherein the overlap portion of the first roofing shingle is covered by the second roofing shingle,
wherein the reveal portion of the first roofing shingle is not covered by any water shedding layer or roofing shingle, and
wherein the reveal portion of the first water shedding layer is not covered by any water shedding layer or roofing shingle, and wherein a width of the reveal portion of the first water shedding layer is different than a width of the reveal portion of the first roofing shingle.

2. The roofing system of claim 1, further comprising: at least one solar cell above the first water shedding layer.

3. The roofing system of claim 1, wherein the width of the reveal portion of the first water shedding layer is greater than the width of the reveal portion of the first roofing shingle.

4. The roofing system of claim 1, wherein the first water shedding layer comprises a sheet.

5. The roofing system of claim 1, wherein the first water shedding layer comprises a sheet from a roll.

6. The roofing system of claim 1, further comprising:
at least one flashing member,
wherein the at least one flashing member is under
the first water shedding layer on the first area of the roof deck and
the first roofing shingle on the second area of the roof deck.

7. The roofing system of claim 6, wherein the at least one flashing member comprises a plurality of flashing members.

8. The roofing system of claim 1, wherein there is no flashing between the first area of the roof deck and the second area of the roof deck.

9. A method, comprising:
obtaining a first water shedding layer,
wherein the first water shedding layer comprises a reveal portion;
obtaining a plurality of roofing shingles,
wherein the plurality of roofing shingles comprises at least a first roofing shingle and a second roofing shingle, and
wherein the first roofing shingle comprises an overlap portion and a reveal portion;
installing the first water shedding layer on a first area of a roof deck;
installing the first roofing shingle on a second area of the roof deck,
wherein the second area pf of the roof deck is adjacent the first area of the roof deck;
installing the second roofing shingle on the roof deck,
wherein the second roofing shingle is installed on the second area of the roof deck, such that the second roofing shingle covers the overlap portion of the first roofing shingle,
wherein ends of the first roofing shingle and the second roofing shingle are adjacent to an end of the at least one water shedding layer
wherein the ends of the first roofing shingle and the second roofing shingle do not overlap the at least one water shedding layer
wherein the reveal portion of the first roofing shingle is not covered by any water shedding layer or roofing shingle,
wherein the reveal portion of the first water shedding layer is not covered by any water shedding layer or roofing shingle, and
wherein a width of the reveal portion of the first water shedding layer is different than a width of the reveal portion of the first roofing shingle.

10. The method of claim 9, wherein installing the first water shedding layer occurs before installing the first roofing shingle.

11. The method of claim 9, wherein installing the first water shedding layer occurs after installing the first roofing shingle.

12. The method of claim 9, wherein installing the first water shedding layer occurs after installing the first roofing shingle and the second roofing shingle.

13. The method of claim 9, wherein installing the first water shedding layer occurs after installing the first roofing shingle and before installing the second roofing shingle.

14. The method of claim 9, wherein at least one solar cell is above the first water shedding layer.

15. The method of claim 9, wherein the width of the reveal portion of the first water shedding layer is greater than the width of the reveal portion of the first roofing shingle.

16. The method of claim 9, wherein the first water shedding layer comprises a sheet.

17. The method of claim 9, wherein the first water shedding layer comprises a sheet from a roll.

18. The method of claim 9, further comprising:
obtaining at least one flashing member; and
installing the at least one flashing member on the roof deck,
wherein the at least one flashing member is installed under
the first water shedding layer on the first area of the roof deck and
the first roofing shingle on the second area of the roof deck.

19. The method of claim 18, wherein the at least one flashing member comprises a plurality of flashing members.

20. The method of claim 9, wherein there is no flashing between the first area of the roof deck and the second area of the roof deck.

\* \* \* \* \*